Fig. 2

INVENTORS.
Robert L. Fox
John A. Smith
BY Webb, Mackey & Burden
THEIR ATTORNEYS

Aug. 11, 1959   R. L. FOX ET AL   2,898,792
POWER-OPERATED TRACK WRENCH
Filed April 17, 1957   9 Sheets-Sheet 3

INVENTORS.
Robert L. Fox
John A. Smith
BY Webb, Mackey + Burden
THEIR ATTORNEYS

INVENTORS.
Robert L. Fox
John A. Smith
BY Webb, Mackey & Burden
THEIR ATTORNEYS

Aug. 11, 1959    R. L. FOX ET AL    2,898,792
POWER-OPERATED TRACK WRENCH
Filed April 17, 1957    9 Sheets-Sheet 6

INVENTORS.
Robert L. Fox
John A. Smith
BY Webb, Mackay & Burden
THEIR ATTORNEYS

INVENTORS.
Robert L. Fox
John A. Smith

THEIR ATTORNEYS

2,898,792
POWER-OPERATED TRACK WRENCH

Robert L. Fox, Alexandria, Va., and John A. Smith, Charlotte, N.C., assignors to Railway Maintenance Corporation, Pittsburgh, Pa., a corporation of Pennsylvania Application April 17, 1957, Serial No. 653,435

9 Claims. (Cl. 81—54)

Our invention is a machine to thread nuts onto and remove nuts from bolts extending through holes in rails and joint bars in a quick and effcient manner with a minimum of man power and hand labor.

Sections of rail are laid in alignment with each other and are attached together by joint bars extending between the rail sections and bolted to each of the sections. To affix the joint bars to the rails, several men place the joint bars on each side of the rail by hand, insert bolts through holes in the bars and rails, and thread nuts onto the bolts. Subsequently, men with single-hand or power wrenches tighten the nuts to the proper degree. One of the disadvantages of this method for applying joint bars is that the bars may be cocked with respect to the rails when the nuts are tightened, resulting in an improper joint and the bars become loose after a few trains have passed over the rail. The expense involved in this method is very large due to the number of men necessary to perform the operation.

The known machines for tightening rail nuts consist of a single power wrench mounted on wheels to move along a railroad track. The wrench is hand manipulated to bring the wrench socket into contact with the nuts to be tightened. A clutch mechanism transmits motive power to the wrench. These known machines are slow and arduous to operate and do not apply a uniform torque to all the nuts.

The present invention is a multiple tool machine which avoids the above disadvantages by providing six power wrenches mounted on a wheeled vehicle to move along a railroad track. The positions of the wrenches are adjustable to accommodate different types of rails and joint bars. The wrenches function to tighten all the nuts of a single joint bar with a uniform torque.

The present invention also provides means for accurately spotting or positioning the sockets of the wrenches on the nuts to be tightened. The joint bar is pushed into proper position on the rail by this spotting means.

The present invention further provides means to maintain the joint bars in tight at the base of the rails, thus resulting in a secure joint being formed when a uniform torque is applied to the nuts.

In the drawings we have illustrated a preferred embodiment of our invention, in which.

Briefly, the nutting machine is a 4-wheeled, self-propelled vehicle arranged to travel on a railroad track, with a head frame supporting torque or impact wrenches to remove or tighten nuts on track bolts extending through holes in rails and joint bars. The machine is adjustable to permit the wrenches to be adapted to any size of rail, design of splice bar, or bolt spacing.

The frame of the machine consists of longitudinally extending channel members 5 attached together by cross channel members 6. Two front cross members 6 extend transversely beyond the channel members 5 and are connected together by short longitudinally extending channel members 7 to form a wider portion of the frame on the front of the machine than on the rear.

Mounted on the rear of the frame are a compressor and fuel tank 8, an air tank 9 into which the compressor feeds pressurized air, and a reserve air tank 10 for the brake system of the machine.

An air motor 11 coupled to a transmission 12 moves a drive chain 13 which rotates a front axle 14 of the machine, thus providing a motive force for the machine. A seat 15 covered by a roof 16 is mounted toward the forward end of the frame. A control desk 17 is located in front of the seat 15 and within easy reach of an operator sitting on the seat.

Front and rear axles 14 with wheels 18 mounted thereon are fixed to the frame to move the machine along a railroad track.

Triangular plates 19 are welded to channels 7 on each side of the frame. Two cross slide tubes 20 extend transversely between the plates 19 and are fixed at their ends to the plates. Two C-shaped head carriage plates 21 are welded to head mast carriage tubes 22 which are slidably mounted on the cross slide tubes 20. Two cylindrical head masts 23 are rigidly positioned vertically between the extending C-portions of the plates 21. A head frame 24 consisting of side plates 25 and end plates 26 is slidably mounted on the head masts 23 by slide cylinders 27. Positioned between the head mast tubes 23 and extending in a vertical direction is a head lift cylinder 28 (shown in Figure 11). The lower end of the cylinder 28 is pivotally fixed to a plate 28a welded to the lower extending C-portions of plates 21. A piston rod extending upwardly from cylinder 28 is pivotally fixed to L-plates 28b welded to the head frame end plate 26. Thus, when the cylinder 28 is actuated, the head frame moves vertically guided by slide cylinders 27 moving along head masts 23.

The head carriage and frame are movable transversely of the machine to a position over either rail of the track by means of a cross travel air motor 21a which actuates a transversely extending chain connected to the head carriage plate 21. When the motor 21a is actuated, the head carriage and head frame move transversely across the front of the machine guided on the slide tubes 20 by carriage tubes 22. It should be noted that any known means may be used to actuate the head carriage and frame in this transverse movement; for example, hydraulic or pneumatic cylinders.

Figure 19:
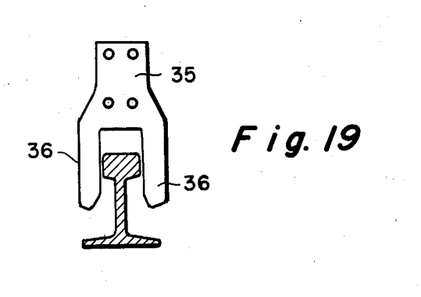
Figure 19 is a front view of the stop bar straddling a rail.

A head travel cylinder 29 is positioned between the plates 25 of the head frame and pivotally mounted to the rear end plate 26 of the frame. A piston rod extending from cylinder 29 is pivotally mounted at 29a to a head carriage yoke 30 consisting of two parallel plates positioned between the plates 25 of the head frame (see Figure 11). Two cylindrical sleeves 31 are integral with and depend downwardly from the parallel plates of the yoke. A head slide shaft 44 is slidably mounted in the sleeves 31 and is pivotally mounted at its rear end to a bracket 44a welded to the end plate 26 of the head frame and is loosely mounted at its front end in a slotted bracket 44b welded to the head frame. The sleeves 31 have downwardly extending integral arms 32 with a bracket 33 on the lower end thereof to which can be affixed shims 34 to vary the height of the wrenches relative to the rail. The rear arm 32 has an additional stop bar 35 welded thereto which has two depending tongues 36 for straddling the rail (see Figures 1 and 19). In operation, the machine is moved forward under its own propelling power to the approximate location of the joint bar. The machine is stopped and the head is lowered until the shims 34 contact the top of the rail. The tongues 36 will be in straddling position on the rail at this time as shown in Figure 19. The head is then moved forward by cylinder 29, if necessary, to bring the tongues 36 into contact with the rear of the splice bar which has been loosely bolted to the rails. In this manner, the stop bar 35 and shims 34 locate the wrenches in the approximate transverse location of the nuts and bolts extending through the rail.

Figure 3:
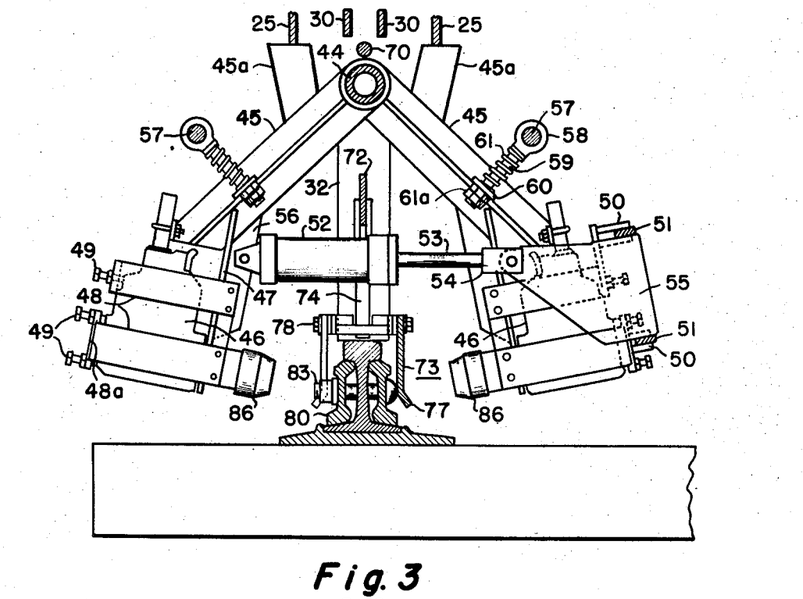
Figure 3 is an enlarged view of the wrenches in open position.
Figure 4:
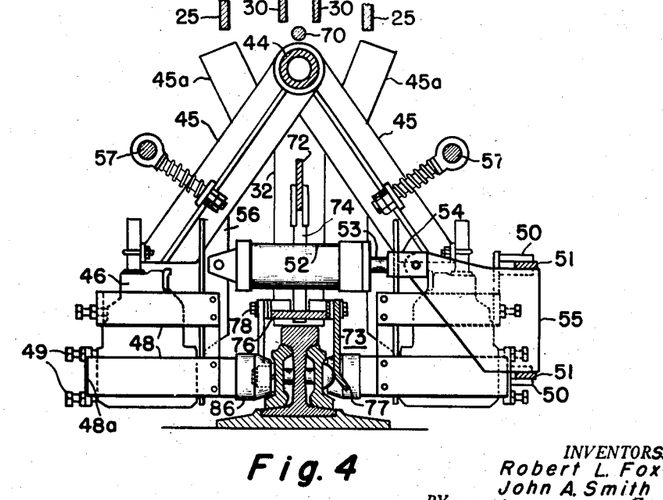
Figure 4 is an enlarged view of the wrenches in closed position.

Wrench supports 38, 39, 40, 41, 42, and 43 are all identical in structure and comprise an upper tubular member which is slidably mounted on the head slide shaft 44, and a depending integral arm 45 to which is welded a box-like frame consisting of a front plate 47, side plates 48, and a rear plate 48a, in which are housed the wrenches 46. Screw means 49 lock the wrenches rigidly in the box-like frame. Two adjacent frames on each side of the head are joined together by wrench clamping bars 51 pivotally connected at each of their ends to tongues 50 welded to the rear plates 48a of the frames. A wrench clamping cylinder 52, Figures 3 and 4, is pivotally fixed to a plate 56 welded to the arm 45. A rod 53 depending from cylinder 52 has an integral clevis 54 which is pivoted on a bracket 55 welded to bars 51. Thus when the rod 53 moves inwardly into cylinder 52, a pull is exerted on wrench clamping bars 51, thereby swinging two wrenches from one side of the head inwardly and the cylinder 52 exerts a pull on plate 56, thereby swinging a wrench from the other side of the head inwardly. Figure 3 shows the wrenches in outward position and Figure 4 shows the wrenches swung inward to operating position.

The wrench supports 38 to 43 are separated from each other and from sleeves 31 by wrench spacers 62 to 68 having integral tabs 69 extending upwardly therefrom. A spacer lock bar 70 passes through a hole in each of the tabs and each end of the bar fits into holes 70a located in the yoke 30. The bar is maintained rigid with the yoke by a set screw 71. Thus when the head travel cylinder 29 is actuated to move the wrenches horizontally and into alignment with the nuts on the bolts in the rail, it exerts a horizontal force on the carriage yoke 30 through connection 29a which, in turn, slides the sleeves 31, the wrench supports 38 to 43, and the spacers 62 to 68 along the head slide shaft 44. If a different spacing of the wrenches and wrench supports is desired, the lock bar 70 is removed after loosening set screw 71, new spacers are placed between the supports, and the lock bar is reinserted and locked in place by set screw 71.

Figures 10, 12, 13, 14, 15:
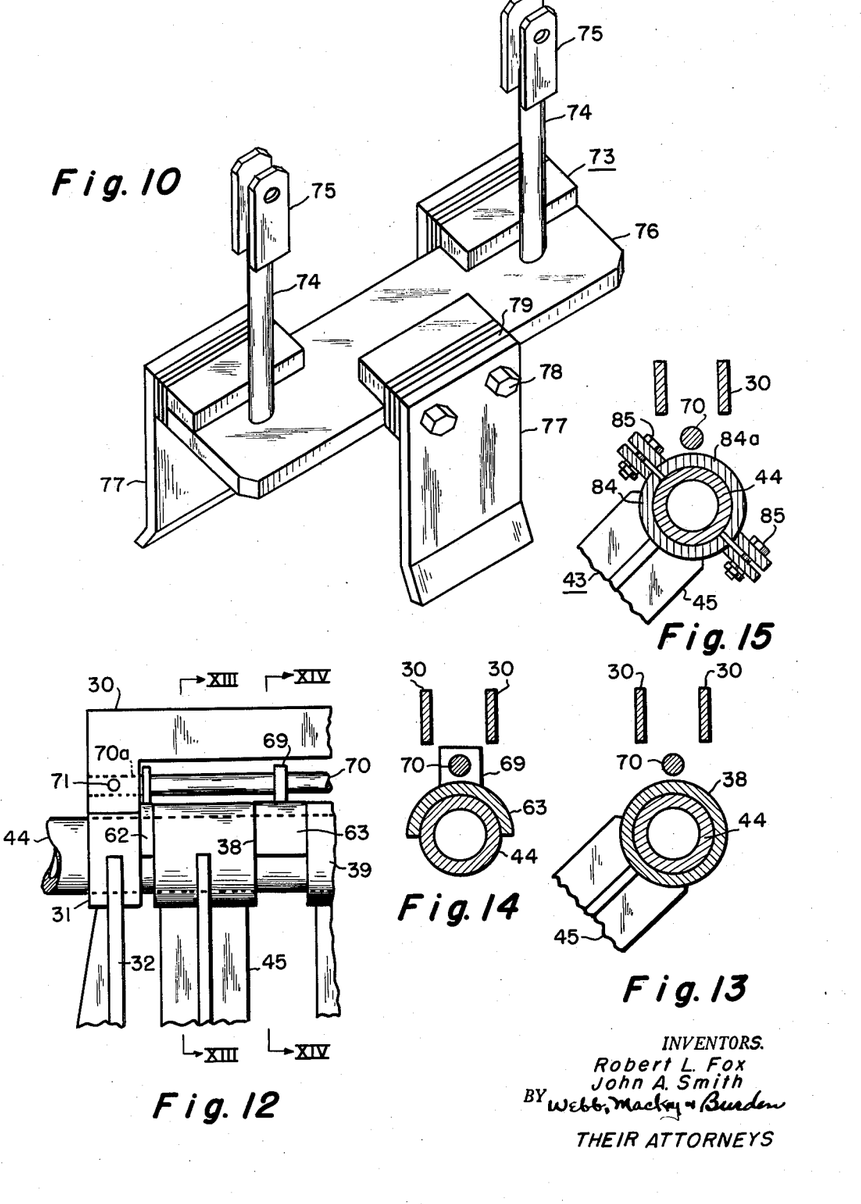
Figure 10 is a perspective of the bucking-up frame.
Figure 12 is an enlarged view of the front portion of the yoke and wrench support.
Figure 13 is a cross section view taken on line XIII—XIII of Figure 12.
Figure 14 is a cross section view taken on line XIV—XIV of Figure 12.
Figure 15 is a cross section similar to Figure 13 but showing the split yoke.

A cross bar 72 is rigidly affixed at its ends to the plates 32 and extends between the plates. A bucking-up frame 73 is loosely connected to bar 72 by pins passing through the bar and clevises 75 which are rigidly connected to frame 73 by arms 74. A flat plate 76 is integral with the lower ends of arms 74 and has bucking-up plates 77 extending downwardly therefrom. The plates 77 are fastened to the plate 76 by means of bolts 78. Shims 79 may be inserted between the bucking-up plate 77 and the plate 76 to provide adjustment in the bucking-up frame to accommodate any size track bolt.

Figures 16, 17, 18:
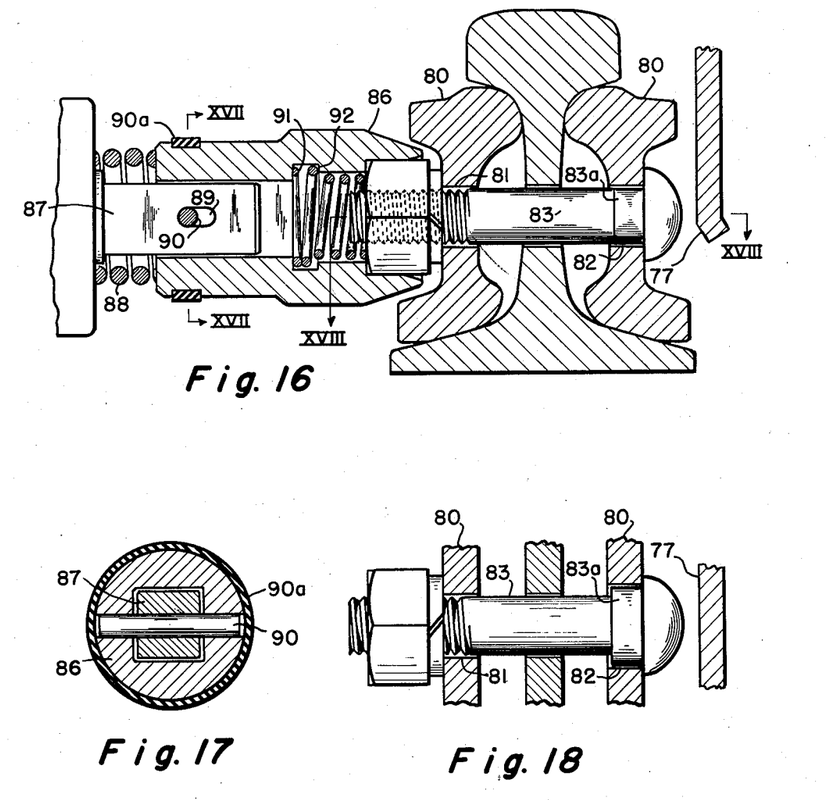
Figure 16 is a cross section of the wrench socket positioned on a nut.
Figure 17 is a cross section of the wrench socket taken on line XVII—XVII of Figure 16.
Figure 18 is a cross section of the track bolt and nut taken on line XVIII—XVIII of Figure 16.

A wrench socket 86 as shown in Figure 16 is commonly used on the wrenches in the present invention. A shaft 87 extends outwardly from the wrench drive mechanism and has a spring 88 positioned between the wrench drive mechanism housing and the wrench socket 86. A pin 90 extends through holes in the socket and through a slot 89 in shaft 87 as shown in Figure 17. The pin is maintained in the holes and slot by a rubber band 90a encircling the wrench socket in the area of the slot. The spring 88 and the loose connection between shaft 87 and socket 86 provides a degree of mobility and resiliency to the socket to compensate for minor inaccuracies in aligning the socket with a nut.

A nut ejection spring 91 is maintained inside the wrench socket by shoulders 92 abutting a portion of spring 91 which is of greater diameter than the remainder of the spring. After a nut has been removed from a track bolt, the nut will sometimes be retained within the socket if ejection means are not provided for removing it therefrom. The nut ejection spring 91 expeditiously expels the nut from the socket by exerting an outward force upon the nut due to the spring's compressed position when a nut is in the socket.

Figures 11, 22, 23:
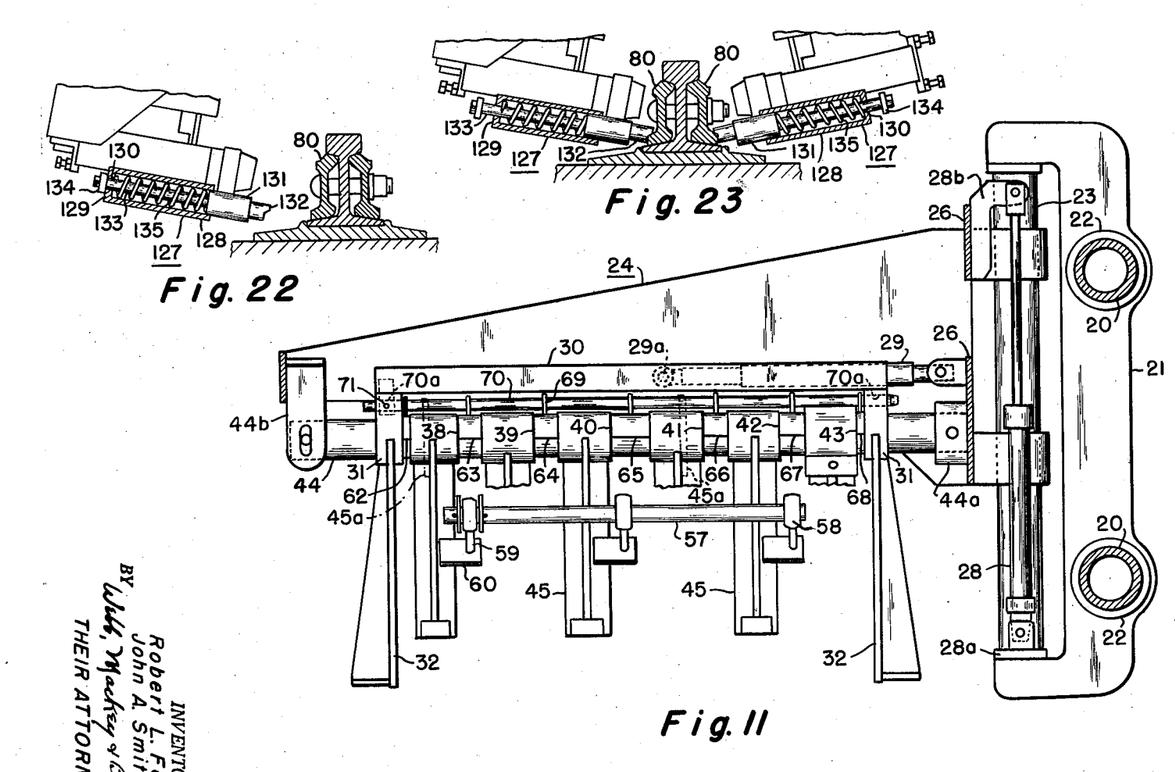
Figure 11 is an enlarged side view of the yoke and wrench support with parts removed for clarity.
Figure 22 is a cross section of the joint bar holder in retracted position taken on line XXII—XXII of Figure 5.
Figure 23 is a cross section of the joint bar holders in the inward position maintaining the joint bars tight against a rail.

An equalizer bar 57 may be used on each side of the head to stabilize the wrenches as shown in Figures 3, 4 and 11. The bar extends along each side of the head and has sleeves 58 slidably positioned thereon with an integral depending arm 59 extending inwardly and through a plate 60 welded to arm 45. A spring 61 is positioned between the sleeve 58 and the arm 45. Nuts 61a prevent the arm 59 from passing outwardly through the hole in plate 60 due to the pressure exerted by spring 61. Due to the unbalanced weight because two swingably mounted wrenches are mounted one one side of the wrench clamping cylinder 52 and only one wrench on the other side of the cylinder, there is a tendency for the single wrench to swing upward to an elevation greater than the two interconnected wrenches on the opposite side of the cylinder 52. The wrench equalizer bar 57 which is connected to each of the arms 45 on each side of the head holds the three wrenches on each side in line and prevents this swinging movement of the single wrench. If equalizer bars are used on the machine as above described, it is normally not necessary to use a spring 88 on the wrenches to give the wrench sockets flexibility.

Plates 45a are welded at their lower ends to wrench supports 45 and their upper ends are free to move into and out of contact with plates 25. Thus when the nutting machine is used on super-elevations, the wrenches are prevented from swinging to one side of the center line of the rail which would result in the machine being difficult to operate on super-elevations.

Joint bar holders 127 are affixed to the side plates 48 of the box-like frames housing the wrenches and resiliently maintain the joint bars 80 in proper position against the rails. The holders consist of a hollow cylinder 128 having one end closed by a plate 129 with a hole 130 in the center thereof. A plunger 131 is reciprocable within cylinder 128 and has an integral forwardly extending arm 132 with a notched front surface to engage the joint bar 80. An arm 133 is integral with plunger 131 and extends rearwardly therefrom through hole 130 in plate 129 and terminates in an integral head 134. A spring 135 is positioned around arm 133 inside cylinder 128 between plunger 131 and plate 129 to maintain the plunger and the arm 132 in a forward position, as shown in Figure 22, when the arm 132 is not in contact with the joint bar. The head 134 is of greater diameter than hole 130, thus limiting the forward motion of plunger 131.

Figure 5:
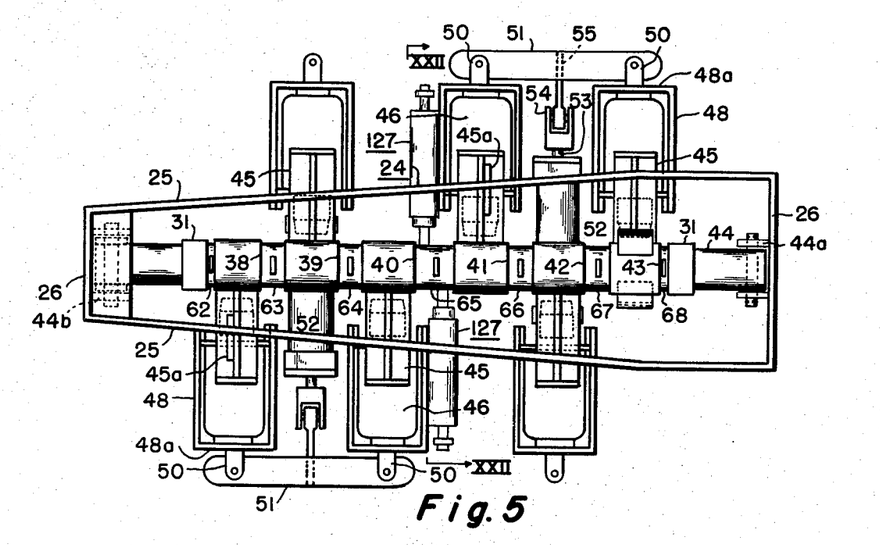
Figure 5 is an enlarged plan view of the head.

Figure 5 shows one joint bar holder 127 positioned on each side of the rail; however, it is within the scope of the present invention to provide any number of resilient holders on each side of the rail to maintain the joint bar in proper position during tightening of the nuts.

The holders 127 are swung from the retracted position shown in Figures 5 and 22 to the inward position shown in Figure 23 simultaneously with the inward movement of the wrenches described above.

Figure 7:
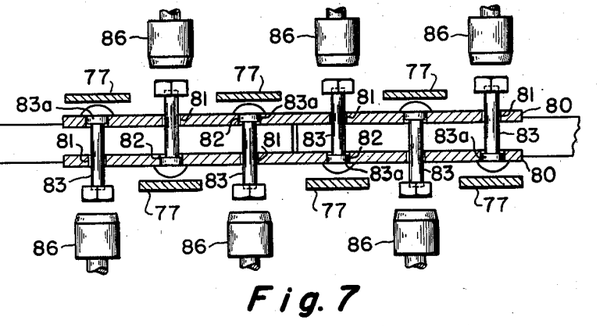
Figure 7 is a cross section of a 6-hole joint bar.

The conventional 6-hole joint bar 80 used on railroad tracks consists of two plates, one positioned on each side of the rail and each having alternate circular holes 81 and oval holes 82. Such a joint bar is shown in Figure 7 with the wrenches 46 and the bucking-up plates 77 in lateral alignment with the nuts and track bolts. Figure 18 shows an enlarged view of a track bolt 83 having an oval head portion 83a which is inserted into the oval holes 82 in the joint bar 80 to prevent the track bolt from rotating when the nut is applied. A portion of the bolt head is of greater diameter than the oval portion to prevent the head from passing through the oval hole.

Figure 6:
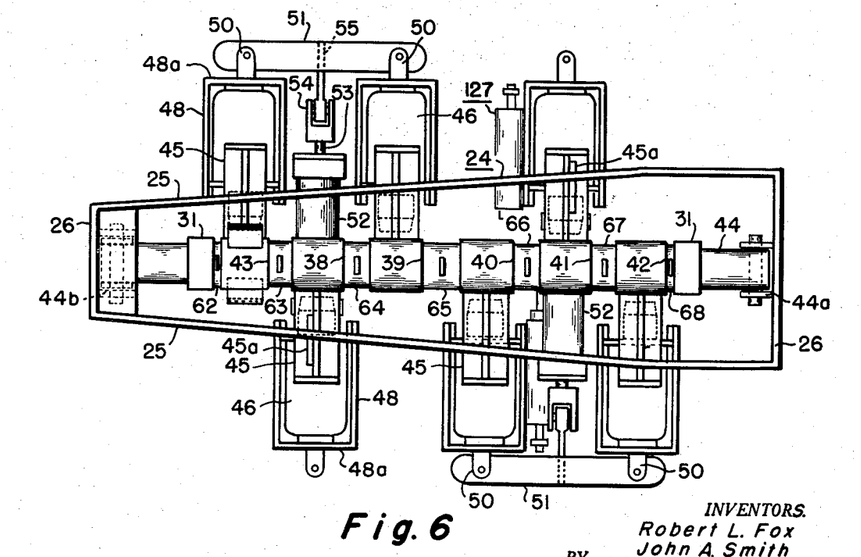
Figure 6 is an enlarged plan view of the head with the wrenches arranged for a modified form of joint bar.
Figure 8:
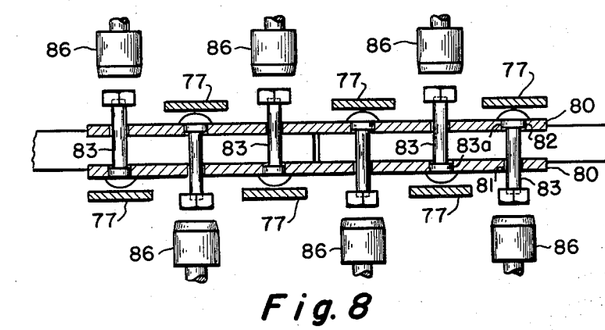
Figure 8 is a cross section of a modified 6-hole joint bar.

Figure 8 shows another joint bar which is commonly used having oval and circular holes in the bar interchanged from the positions shown in Figure 7. When a joint bar of this configuration is used, it is necessary that the wrenches be repositioned to the configuration shown in Figure 6. To permit easy repositioning of the wrenches, the rear wrench support sleeve 43 is split into two semicircular portions 84 and 84a as shown in Figure 15. The two portions are bolted together on the slide tube 44 by means of nuts and bolts 85. Thus, when a joint bar as shown in Figure 8 is encountered on a rail, the nuts and bolts 85 are removed, the wrench clamping bar 51 is released from the rear wrench and the rear wrench is moved up to the forwardmost position by sliding the remainder of the wrenches rearwardly. The wrench support portions 84 and 84a are repositioned on the front of the slide tube 44, nuts and bolts 85 are tightened, and the wrench clamping cylinder and wrench clamping bars 51 are repositioned to the arrangement shown in Figure 6. With the wrenches in this configuration, the joint bar shown in Figure 8 may be used on the rails.

Figure 9:
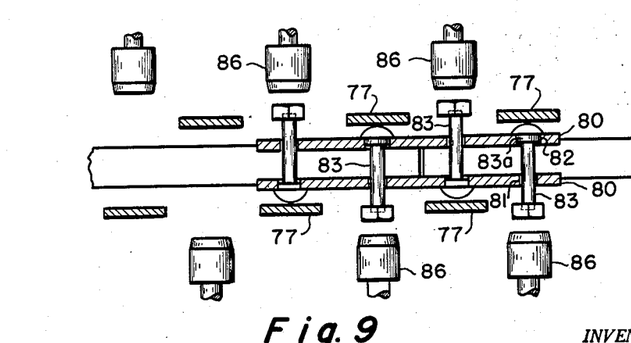
Figure 9 is a cross section of a 4-hole joint bar.

Another commonly used joint bar is shown in Figure 9 and has only four holes extending through each bar. The nutting machine of the present invention can operate efficiently on such a 4-hole joint bar without any adjustments or it may be found desirable to put stops on the front two wrenches to prevent them from swinging in too far and possibly forcing the other wrenches off the nuts on the rail bolts.

Figure 20:
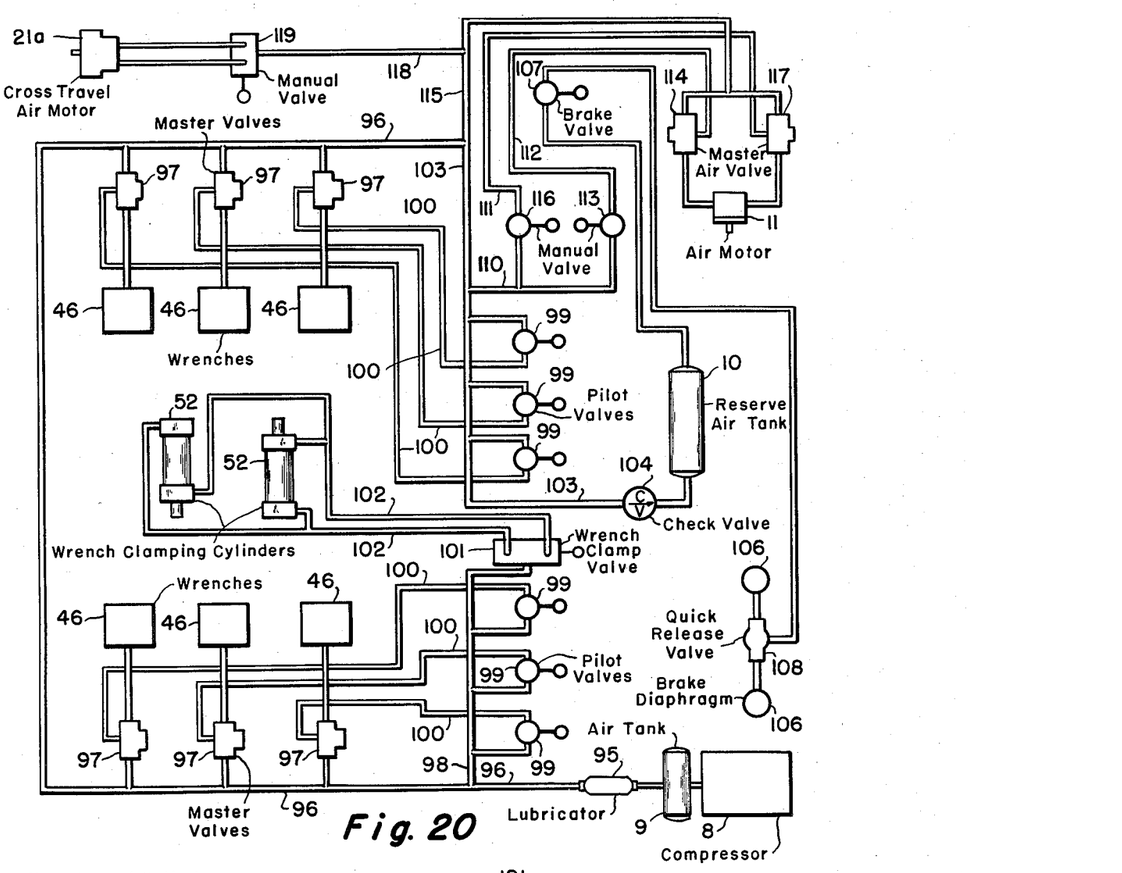
Figure 20 is a schematic view of the air power system for the machine.

The air power system for the present invention is shown in Figure 20 and consists of an air compressor 8 which maintains pressurized air in a tank 9. The pressurized air passes from tank 9 through a lubricator 95 interposed in line 96 which leads directly to master valves 97 for each of the wrenches. A line 98 leads from line 96 to pilot valves 99 for each of the wrenches which, in turn, control the master valves 97 by means of lines 100. Thus, when any of the pilot valves 99 are manually actuated, the respective wrench 46 is actuated. A special hand lever 99a (Figure 1) is provided to actuate all of the pilot valves 99 simultaneously to avoid the necessity of the operator actuating each one separately. The line 98 also leads to the wrench clamp valve 101 which actuates the wrench clamping cylinders 52 by feeding pressurized air through lines 102.

Figure 1:
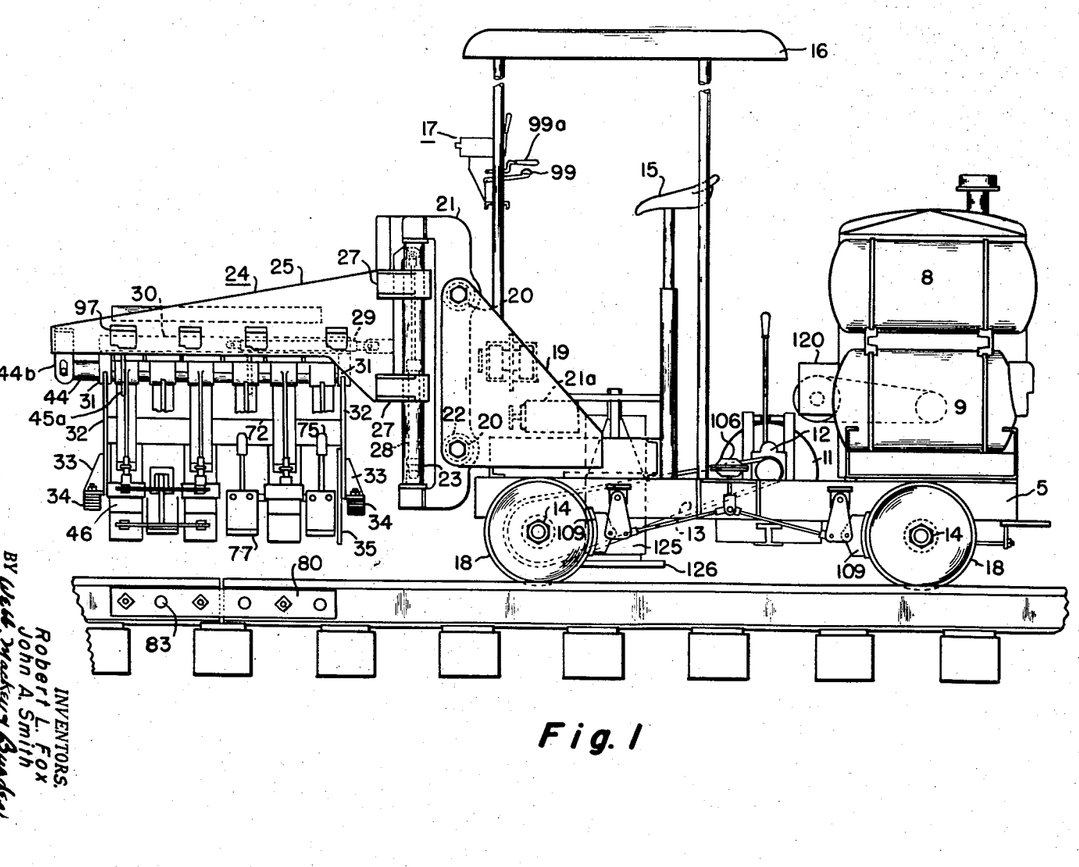
Figure 1 is a side elevation view of the nutting machine.

The line 96 also feeds air to line 103 which passes through a one-way check valve 104 to maintain a brake reserve tank 10 at the proper pressure to actuate the brake diaphragms 106 by means of a brake valve 107. A quick release valve 108 is also provided in the brake system. The brake mechanism is shown in Figure 1 with the brake shoe 109 against the front and rear wheels 18. Any conventional braking mechanism may be used on the present vehicle without deviating from the scope of the invention.

Another feed line 110 branches from line 103 and divides into two feed lines 111 and 112. The line 112 passes through a manual valve 113 which actuates a master air valve 114 which, in turn, actuates the propelling motor 11 to move the nutting machine in a backward direction. The power for the air motor is introduced through line 115 which feeds from line 96. Master valve 114 opens line 115 into direct contact with the air motor 11. The line 111 passes through a manual valve 116 and to a second master valve 117 which actuates the air motor 11 to move the nutting machine in a forward direction. Master air valve 117 likewise operates to open the line 115 to admit air to the motor 11.

Another feed line 118 leads from line 115 through a manual valve 119 which actuates motor 21a to provide for the cross movement of the head.

Figure 21:
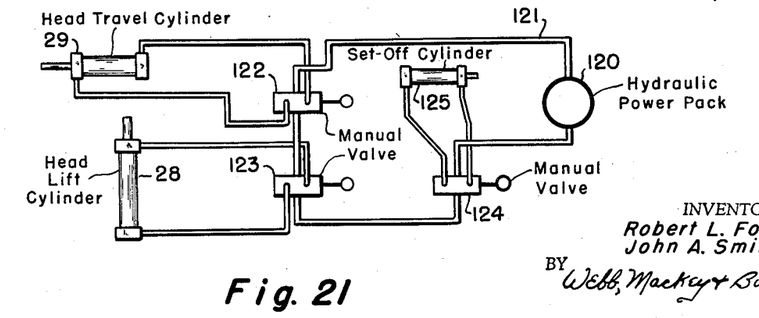
Figure 21 is a schematic view of the hydraulic power system for the nutting machine.

The hydraulic power system for the nutting machine is shown in Figure 21 and consists of a hydraulic power pack 120 which feeds pressurized hydraulic fluid through a line 121 to a manual valve 122 which actuates the head travel cylinder 29. The line 121 also feeds hydraulic fluid to manual valve 123 which actuates the head lift cylinder 28. The valves 122 and 123 have three positions: a neutral closed position, a first position to actuate its respective cylinder in one direction, and a second position to actuate the cylinder in a reverse direction to that obtained by the first position. Line 121 further feeds pressurized fluid to a set-off cylinder control valve 124 which actuates a set-off cylinder 125. The set-off mechanism for the machine is mounted at approximately the center of gravity of the machine and consists of a plate 126 welded to the bottom of the rod extending from cylinder 125. The plate is actuatable downwardly into contact with the crib or ties by the cylinder 125 to hoist the wheels 18 of the machine clear of the track. Once the machine is in the raised position, it may be turned around manually so that the nutting machine may be driven to a siding or back to the starting point without having to drive it in reverse; or the machine may be rotated only 90° and rails set under the wheels 18 to remove the machine from the track to permit the passage of a train.

*Operation*

In replacing old track bolts, the machine is moved to the approximate location of the joint bar being retained on the track by the old nuts and bolts; the head is lowered by cylinder 28 until shims 34 contact the top of the rail; and the head is moved forward, if necessary, until the tongues 36 of stop bar 35 abut the rear of the joint bar. The plates 77 of the bucking-up frame 73 were lowered into contact with the heads of the track bolts simultaneously with the lowering of the head by cylinder 28. The cylinders 52 are actuated to swing the wrenches into contact with the nuts to be loosened. Either individually by valves 99, or simultaneously by lever 99a, the wrenches are actuated to unthread the old nuts from the bolts. The wrenches are swung away from the track by cylinders 52 and the springs 91 in the wrench sockets eject the removed nuts from the sockets.

In laying new track, the joint bars are manually placed on each side of the rail, bolts are inserted through the holes in the rails and bars and nuts are loosely threaded on the bolts just sufficient to maintain the nuts on the bolts. The nutting machine is moved forward and the wrenches are aligned with the nuts in the same manner as described above. The wrenches and joint bar holders 127 are moved inwardly by cylinders 52 and the wrenches are actuated, either by valves 99 individually or by lever 99a simultaneously, to thread the nuts onto the bolts. The wrenches are then swung outwardly to the position shown in Figure 3.

Figure 2:
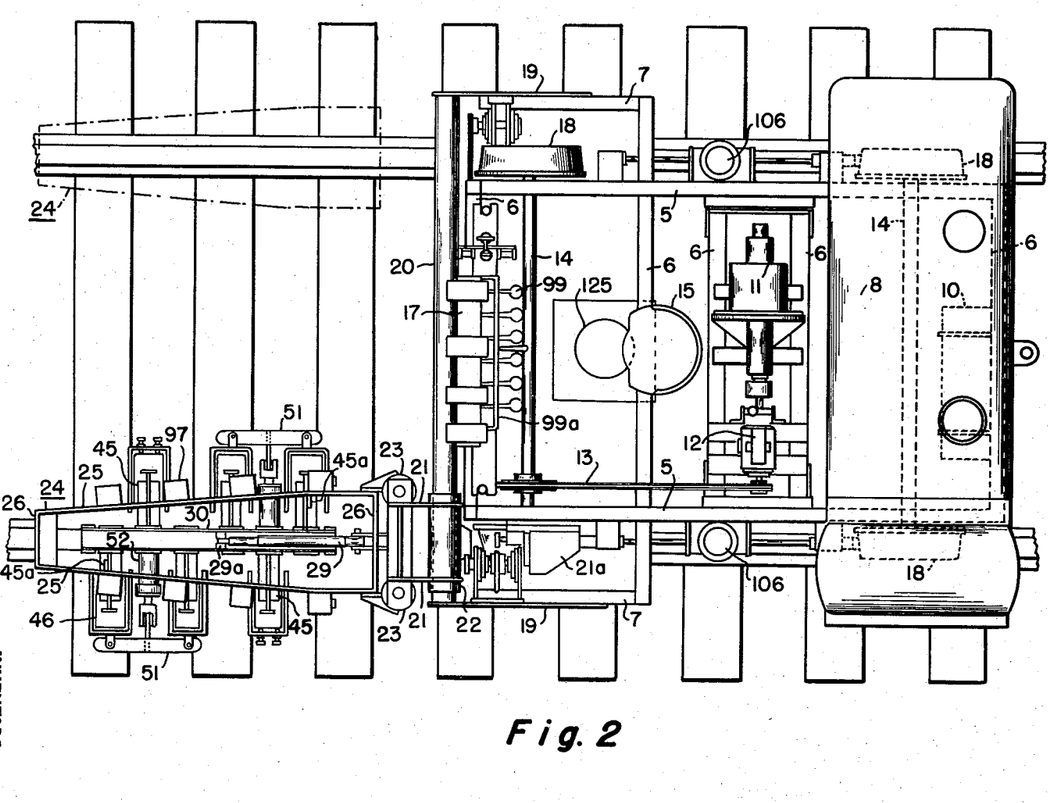
Figure 2 is a plan view of the nutting machine.

The head is then raised and moved transversely of the machine by motor 21a to the dotted line position shown in Figure 2 if another joint bar having nuts to be tightened is located on the other rail of the track. The procedure for tightening the nuts described above is then repeated.

The nuts are easily threaded on the bolts initially until the nuts bottom or contact against the joint bar. At this point the pneumatic pressure builds up to a maximum, preferably 100 pounds, to apply a uniform torque to all of the nuts. This uniform application of torque is not achieved in the known machines due to vibration and wear of the machines in use.

While we have described a present preferred embodiment of our invention, it is to be understood that it may be otherwise embodied within the scope of the following claims.

We claim:

1. A machine for tightening nuts on rail joint bolts passing through holes in rails and joint bars, comprising a vehicle movable along a pair of rails, a carriage frame mounted on the vehicle, a head frame supported by said carriage frame, means to move said head frame vertically and transversely relative to the vehicle and said carriage frame; said head frame being movable transversely from a position over one of the rails to a position over the second rail; downwardly directed arms swingably mounted on the head frame, each of said arms carrying a power driven wrench; a bucking-up frame rigidly affixed to and depending downwardly from the head frame, said bucking-up frame having plates movable into contact with heads on the rail joint bolts to maintain the bolts in the holes in the rails and joint bars; and means to swing said arms downwardly until the power driven wrenches engage the nuts on the joint bolts.

2. The machine as recited in claim 1 including adjustable means on said bucking-up frame to vary the position of the wrenches relative to the base of the rails.

3. The machine as recited in claim 1 including stop means affixed to the machine to but against the joint bars, thereby indicating that the wrenches are in approximate lateral alignment with the nuts on the rail joint bolts.

4. The machine recited in claim 1 including means movable into contact with the joint bars to maintain the bars in tight contact with the rail.

5. The machine recited in claim 1 including means to vary the distances between the wrenches to adjust for variation in the distances between the holes in the rail.

6. The machine recited in claim 1 wherein said arms are swingably mounted on a longitudinally extending shaft in said head frame; and power means to slide said arms longitudinally along said shaft to accurately position the wrenches affixed to the arms in lateral alignment with the nuts on the rail joint bars.

7. The machine recited in claim 1 wherein at least two wrenches are located on each side of said rail with none of the wrenches being in opposing relationship to any other wrench, and said two wrenches on each side being pivotally connected together.

8. A machine for applying a torque to nuts on rail bolts extending through holes in a joint bar and rail, comprising a vehicle movable along the rail, a head frame mounted on the vehicle, wrenches attached to the frame capable of transverse movement relative to the rail, means to actuate the wrenches, at least two of the wrenches being located on each side of said rail with none of the wrenches being in opposing relationship to any other wrench, and said two wrenches on each side being pivotally connected together.

9. A machine for tightening nuts on rail joint bolts passing through holes in rails and joint bars, comprising a vehicle movable along a pair of rails, a frame affixed to and extending forwardly of the vehicle, said frame having a longitudinally extending shaft, downwardly extending arms swingably and slidably mounted on said shaft, power means to move said arms longitudinally along said shaft, power wrenches affixed to the lowermost ends of said arms, second power means to swing said wrenches and arms inwardly toward a rail until the wrenches engage said nuts, a bucking-up frame affixed to said head frame and extending downwardly between said arms, a portion of said bucking-up frame engaging the upper surface of said rail, thereby controlling the position of the head frame relative to the rail, and said bucking-up frame having plates positionable along the sides of said rail and in engagement with the heads of the rail joint bolts.

References Cited in the file of this patent

UNITED STATES PATENTS

| | | |
|---|---|---|
| 1,744,540 | Galloway | Jan. 21, 1930 |
| 1,785,125 | Kalo | Dec. 16, 1930 |
| 1,807,367 | Woolery | May 26, 1931 |
| 1,978,513 | Talboys | Oct. 30, 1934 |
| 2,041,876 | Stowell | May 26, 1936 |
| 2,137,998 | Bronander | Nov. 29, 1938 |
| 2,228,589 | Backes | Jan. 14, 1941 |
| 2,488,894 | Barrett | Nov. 22, 1949 |
| 2,520,269 | Baker | Aug. 29, 1950 |
| 2,552,655 | Talboys | May 15, 1951 |
| 2,682,188 | Ferrell | June 29, 1954 |
| 2,780,950 | Province | Feb. 12, 1957 |